United States Patent
Munk-Hansen

(10) Patent No.: US 9,447,776 B2
(45) Date of Patent: Sep. 20, 2016

(54) TURNING DEVICE TO ROTATE THE ROTATABLE PART OF A WIND TURBINE

(71) Applicant: SIEMENS AKTIENGESELLSCHAFT, München (DE)

(72) Inventor: Thorkil Munk-Hansen, Give (DK)

(73) Assignee: SIEMENS AKTIENGESELLSCHAFT (DE)

( * ) Notice: Subject to any disclaimer, the term of this patent is extended or adjusted under 35 U.S.C. 154(b) by 491 days.

(21) Appl. No.: 14/085,215

(22) Filed: Nov. 20, 2013

(65) Prior Publication Data

US 2014/0224048 A1 Aug. 14, 2014

(30) Foreign Application Priority Data

Feb. 13, 2013 (EP) .................................... 13155080

(51) Int. Cl.
| | |
|---|---|
| F03D 11/04 | (2006.01) |
| F03D 11/02 | (2006.01) |
| F03D 1/00 | (2006.01) |
| F03D 1/06 | (2006.01) |
| F16H 27/02 | (2006.01) |

(52) U.S. Cl.
CPC ............... *F03D 11/02* (2013.01); *F03D 1/003* (2013.01); *F03D 1/0658* (2013.01); *F03D 15/00* (2016.05); *F16H 27/02* (2013.01); *Y02E 10/721* (2013.01); *Y02E 10/726* (2013.01); *Y10T 74/1555* (2015.01)

(58) Field of Classification Search
CPC ...... F03D 15/00; F03D 1/003; F03D 1/0658; F03D 1/066; F16H 27/02; Y02E 10/721; Y02E 10/726; Y10T 74/1555
See application file for complete search history.

(56) References Cited

U.S. PATENT DOCUMENTS

| | | | |
|---|---|---|---|
| 7,353,603 B2 | 4/2008 | Wobben | |
| 7,958,797 B2 * | 6/2011 | Aust | ....................... F03D 1/003 269/32 |
| 8,028,604 B2 * | 10/2011 | Moore | .................. F03D 7/0248 74/665 F |
| 8,246,308 B2 * | 8/2012 | Numajiri | ................. F03D 1/003 416/169 R |
| 8,710,693 B2 * | 4/2014 | Amano | ................... F03D 1/001 290/55 |

(Continued)

OTHER PUBLICATIONS

European Search Report [EPO] Application No. EP13155080.8 Date of Mailing: Jul. 25, 2013; Siemens Aktiengesellschaft (4 pages).

*Primary Examiner* — Richard Edgar
*Assistant Examiner* — Eldon Brockman
(74) *Attorney, Agent, or Firm* — Schmeiser Olsen & Watts LLP

(57) ABSTRACT

A turning device to rotate the rotatable part of a wind turbine that comprises a stationary part and a rotatable part is described. The rotatable part is rotatable with respect to the stationary part of the wind turbine, and the stationary part is located within a nacelle, wherein the nacelle is at least partially enclosed by a housing.

The turning device comprises a first lever and a second lever that is detachably attached to the rotatable part of the wind turbine.

The first lever and the second lever reach from inside the housing of the nacelle through an opening to the outside of the nacelle, so that the drive is located outside of the housing of the nacelle, when the turning device is attached to the wind turbine.

14 Claims, 7 Drawing Sheets

(56) References Cited

U.S. PATENT DOCUMENTS

| | | | | |
|---|---|---|---|---|
| 8,963,361 B2* | 2/2015 | Falkenberg | ............. | F03D 1/001 290/55 |
| 2006/0196288 A1* | 9/2006 | Aust | ....................... | F03D 1/003 74/411.5 |
| 2008/0181761 A1* | 7/2008 | Moore | .................. | F03D 7/0248 415/1 |
| 2012/0133147 A1* | 5/2012 | Numajiri | ................. | F03D 1/003 290/55 |
| 2012/0137481 A1* | 6/2012 | Lindberg | ................ | F03D 1/001 29/23.51 |
| 2012/0308398 A1* | 12/2012 | Agardy | ................... | F03D 1/003 416/244 R |
| 2013/0076042 A1* | 3/2013 | Amano | ................... | F03D 1/001 290/55 |

\* cited by examiner

TURNING DEVICE TO ROTATE THE ROTATABLE PART OF A WIND TURBINE

CROSS-REFERENCE TO RELATED APPLICATIONS

This application claims the benefit of and priority to EP13155080, filed Feb. 3, 2013 under 35 U.S.C. §119, the entire contents of which are hereby incorporated by reference.

FIELD OF TECHNOLOGY

The following relates to a turning device to rotate the rotatable part of a wind turbine.

BACKGROUND

A wind turbine transfers the energy of the wind into electrical energy. The wind turbine comprises a nacelle that is connected to a tower, and a rotor that is connected to the nacelle. The nacelle is usually enclosed by a housing.

The rotor comprises a hub that is rotatably mounted to the nacelle and at least one rotor blade mounted to the hub.

The wind interacts with the rotor blade of the wind turbine in a way that the rotor rotates. The rotation of the rotor is transferred to an electrical generator. The electrical generator is normally a part of the nacelle.

When the wind turbine is erected, the tower is set up and the nacelle is mounted onto the tower. The hub is mounted to the nacelle and the at least one rotor blade is mounted to the hub.

The at least one rotor blade is hoisted up by a crane and connected to the hub. The hub has to be in a predetermined angular rotational position around its axis of rotation to establish the connection between the hub and the rotor blade.

This position corresponds to the direction of the blade during the fastening of the connection. The position can be a horizontal or a vertical arrangement of the hub and the rotor blade for example.

The hub has to be rotated to establish the connection between the hub and a first rotor blade. In the case of more than one rotor blade that has to be mounted, the position of the hub has to be changed. The hub has to be rotated form the first rotational position into a second position to establish the connection between the hub and the second rotor blade.

EP 1 659 286 A1 describes a turning device to rotate the drive train of a wind turbine. The drive train is rotatably mounted in a machine frame. The drive train comprises a flange and the arrangement to rotate the drive train comprises a bracket, which can be fixed to a machine frame. An adapter disk can be affixed to the flange and has a plurality of force application points which are disposed along a circle. A linear setting element is, on the one hand, mounted movably in terms of angle in the bracket. It can, on the other hand, be coupled movably in terms of angle to the adaptor disk by way of the force application points thereof.

The turning device is installed in the nacelle of the wind turbine for the installation of the rotor blades or when a rotation of the hub is needed for service. After the installation of the rotor blades the turning device is dismantled from the wind turbine.

After the installation a first rotor blade, the mass of the rotor blade acts with a certain lever on the hub. Thus a powerful drive is needed to turn the rotor in the position for the installation of a second rotor blade.

This shows the disadvantage that the linear actuator needs to be very strong to turn the rotor of the wind turbine.

SUMMARY

A first aspect relates to an improved means to rotate the hub of a wind turbine during the installation of the rotor blades.

A second aspect relates to a turning device to rotate the rotatable part of a wind turbine is described. The wind turbine comprises a stationary part and a rotatable part, whereby the rotatable part is rotatable in respect to the stationary part of the wind turbine. The stationary part is located within a nacelle, and the nacelle is at least partially enclosed by a housing.

The rotatable part comprises a hub of a rotor of the wind turbine, whereby a turning device is detachably attached to the wind turbine to rotate the rotatable part in respect to the stationary part.

The turning device comprises a first lever that is detachable attached to the stationary part of the wind turbine. The turning device comprises a second lever that is detachable attached to the rotatable part of the wind turbine.

The turning device comprises a drive that is prepared and arranged in a way to move the first lever in respect to the second lever, to rotate the rotatable part of the wind turbine in respect to the stationary part.

The first lever and the second lever are arranged in a way that they reach from inside the housing of the nacelle through an opening to the outside of the nacelle, so that the drive is located outside of the housing of the nacelle, when the turning device is attached to the wind turbine.

The turning device is used to rotate the hub of the wind turbine in respect to the stationary part of the wind turbine. This rotation is used during the installation of the rotor blades of the wind turbine. The rotor blades are attached to the hub of the wind turbine one after the other. Between the installation of a first rotor blade and a second rotor blade, the hub of the wind turbine needs to be rotated into a position to attach the second rotor blade to the hub.

The rotation also has to be performed when one or two rotor blades are already attached to the hub. Thus the load at the hub resulting from the attached rotor blades is very high. The drive has to be powerful enough to be capable to perform the rotation.

Levers are used to transform the forces. A high force needed along a short way is transferred into a lower force applied along a longer way to achieve the same result.

The forces needed to rotate the rotatable part of the wind turbine in respect to the stationary part of the wind turbine are transferred by levers. The first lever and the second lever are long, thus the force needed for the rotation is reduced.

The first lever and the second lever are that long that they reach out of the nacelle of the wind turbine through an opening in the housing of the nacelle.

Thus the drive is arranged at the levers outside of the nacelle. Thus enough space is available for the drive, as the drive is not located in the limited space of the nacelle. Thus a large drive can be used. Thus the drive is powerful enough to perform the rotation. Thus only one drive is needed to rotate the rotatable part of the wind turbine. Thus not a plurality of drives have to be installed.

The turning device is attached to the wind turbine from outside of the housing. The levers are introduced into through the opening in the housing. The levers are attached to the rotatable part and the stationary part of the wind turbine.

Thus the parts of the turning device don't need to be transferred through the tower of the wind turbine to or from the nacelle. Thus the turning device is attachable to the wind turbine very quickly.

The rotatable part of the wind turbine comprises a brake disk and the second lever is attached to the brake disk.

The brake disk is used with brake calibers to slow down and stop the rotatable part of the wind turbine. The brake disk is constructed to take in the forces to brake the rotor also during normal operation of the wind turbine in a high wind situation.

Thus the brake disk of the wind turbine is rigid. The brake disk is rigid enough to be capable to transfer the forces from the turning device to the rotatable part of the wind turbine.

The brake disk comprises holes or cut-outs and the second lever comprises at least one pin. The pin is prepared and arranged in a way that it reaches through a hole or cut-out of the brake disk to connect the second lever to the brake disk.

Holes or cut-outs in the brake disk of the wind turbine are used to employ a rotor lock. The rotor lock is used to fasten the rotatable part of the wind turbine in a certain position. The connection between the rotatable part of the wind turbine and the rotor lock has to be very secure.

Thus a tight and secure connection between the turning device and the brake disk is achieved by using the holes or cut-outs in the brake disk.

In addition, features present in the wind turbine are use. Thus no additional constructive features have to be planned and arranged in the wind turbine to connect the turning device.

At least two pins are prepared and arranged in a way that they reach through two adjacent holes or cut-outs.

Connecting one pin to a hole on the brake disk leads to a connection between the brake disk and the second lever, whereby the pin can rotate in within the hole of the brake disk.

Using two pins in two holes to connect the second lever to the brake disk leads to a connection, where the second lever cannot rotate in respect to the brake disk.

Thus a torque proof connection between the second lever and the brake disk can be achieved. Thus the second lever is attached to the brake disk in a way that rotatable part of the wind turbine is rotated together with the second lever with less force acting in a single hole in the brake disk.

The second lever comprises at least two pins that are arranged in a way to connect to the brake disk. The at least two pins are arranged with a certain predetermined distance, whereby the distance corresponds to an angle of at least 60° seen from the rotational axis of the brake disk.

The second lever is connected to the brake disk by the pins. The force acting on the second lever is transferred to the brake disk via the pins. The force acting on the brake disk in the area of one of the holes is very high, when two neighboring holes are used with pins.

The bigger the distance between the at least two hole is, the lower are the forces acting on the brake disk in the area of the holes.

In at least one embodiment, the two holes used are arranged in an angle of more than 60° along the brake disk seen from the axis of rotation of the brake disk.

Thus the forces acting on the brake disk are more equally distributed and are thus minimized.

The stationary part of the wind turbine comprises a machine frame and the first lever is attached to the machine frame.

The stationary part of the wind turbine comprises a machine frame that supports the rotatable part of the wind turbine. The machine frame also supports parts of the stationary part of the wind turbine, like electrical cabinets.

The machine frame transfers forces acting on it to the tower of the wind turbine.

Thus the forces acting on the first lever are transferred to the tower of the wind turbine. Thus the support of the first lever by the machine frame is rigid and secure.

The stationary part of the wind turbine comprises a support structure that supports an electrical generator of the wind turbine and the first lever is attached to the support structure.

The stationary part of the wind turbine comprises a support structure that supports the electrical generator of the wind turbine. The stator of the electrical generator is attached to the support structure. The support structure transfers the forces acting on the stator of the electrical generator to the tower of the wind turbine.

Thus the connection of the first lever to the support structure of the electrical generator is a very secure and rigid connection.

In addition the brake calipers acting on the brake disk of the wind turbine are attached to the support structure of the generator. Thus the support structure comprises a connection possibility in the area of the brake disk.

The stationary part of the wind turbine comprises a stator of the electric generator and the first lever is attached to the stator of the electric generator.

The stator of the electrical generator is attached to the support structure of the wind turbine. Thus forces acting on the stator of the electrical generator are transferred from the stator via the support structure to the tower of the wind turbine.

Thus the forces acting on the first lever are transferred from the lever via the stator of the electrical generator to the tower of the wind turbine.

The drive comprises at least one linear actuator.

The turning device comprises a drive to move the second lever in respect to the first lever. A linear actuator is used as a drive.

A linear actuator can be a mechanical drive, a hydraulic drive or a pneumatic drive.

A linear actuator is the most direct drive to push or pull the second lever in respect to the first lever. Thus the force of the drive does not need to be transferred by a gear. Thus less energy is lost by a transfer of forces.

Two linear actuators are prepared and arranged in a way that the first linear actuator extends while the second linear actuator retracts when the turning device rotates the rotatable part of the wind turbine.

Linear actuators might show a different force characteristic during extending or retracting movement.

Two linear actuators are arranged in a way that the first is extending during a movement, while the second is retracting. Thus the linear actuators act in opposite directions.

Thus different characteristics in the movement of the linear actuators are leveled out by using two linear actuators that act in opposite directions.

The linear actuator comprises a hydraulic cylinder.

A hydraulic cylinder is a strong linear actuator. Thus a strong force can be used to rotate the rotatable part of the wind turbine, for the installation of rotor blades to the hub for example.

The drive comprises at least one rotatable drive.

A rotatable drive, like an electric motor for example, is used as a drive in the turning device.

The rotatable drive comprises at least one toothed wheel and the second lever comprises a toothed rim. The at least one toothed wheel is prepared and arranged in a way to interact with the toothed rim of the second lever.

The drive comprises a rotatable drive. The rotatable drive comprises a toothed wheel, which is equivalent to a geared wheel. The drive is attached to the first lever. The second lever comprises a toothed rim that interacts with the toothed wheel. When the rotatable drive is moving, the toothed wheel moves the toothed rim. Thus the second lever is moved in respect to the first lever.

The turning device comprises an adapter for a hook of a crane, to hoist the turning device to the nacelle.

The turning device comprises an adapter. The adaptor is connected to a hook of a crane. The turning device is lifted up to the nacelle by a crane. The turning device is attached to the nacelle through the opening in the housing.

Thus the tuning device does not need to be installed into the nacelle through the tower of the wind turbine. It is also not necessary to remove the turning device through the tower of the wind turbine.

Thus it is not necessary to dismantle the turning device into several pieces to remove is from the wind turbine. The turning device is attached and/or removed mainly as one part.

Thus installation time is saved.

The invention is shown in more detail by the help of figures. The figures show embodiments of a configuration and do not limit the scope of the invention.

BRIEF DESCRIPTION

Some of the embodiments will be described in detail, with reference to the following figures, wherein like designations denote like members, wherein.

DETAILED DESCRIPTION

Figure 1:
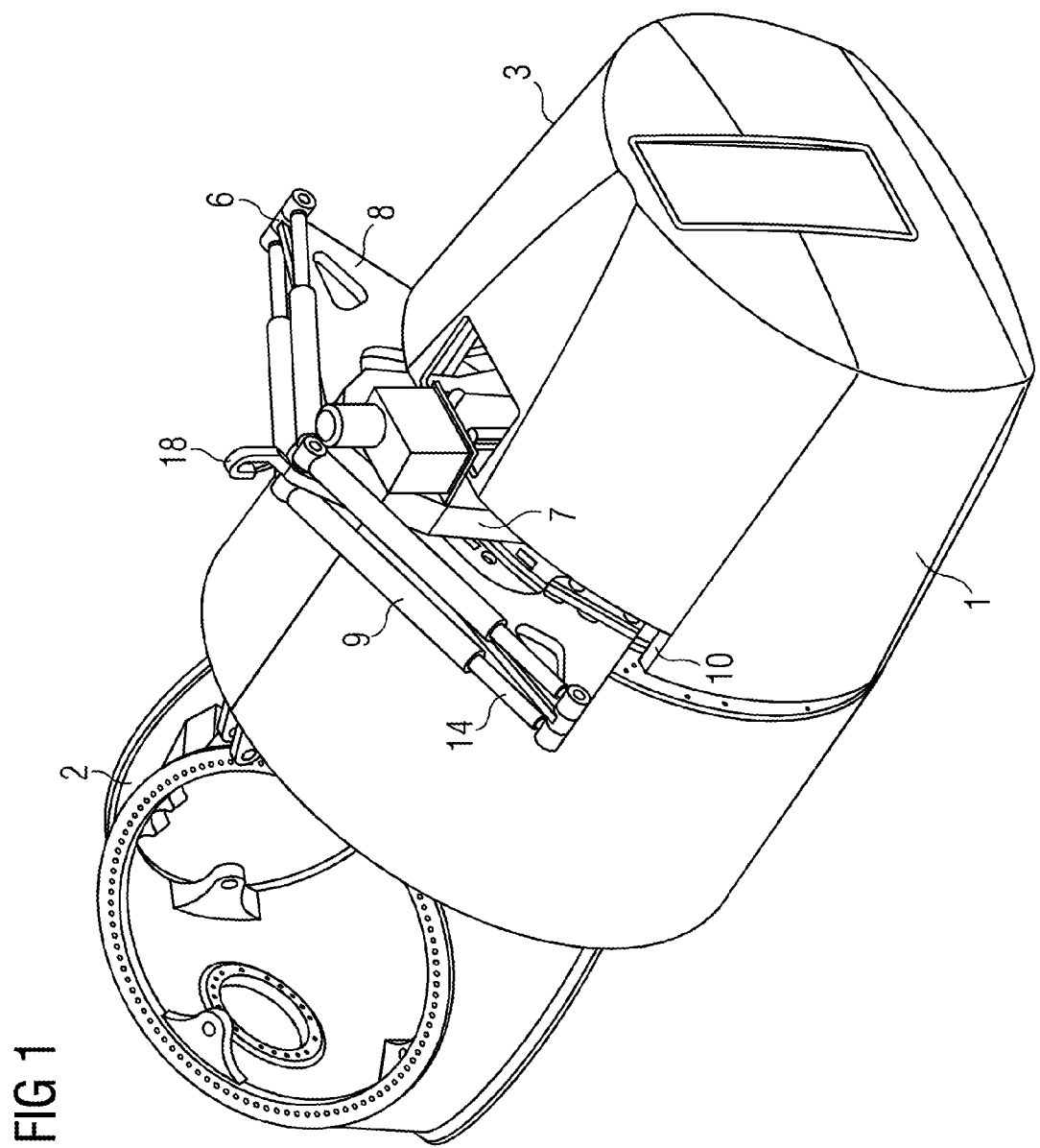
FIG. 1 shows a turning device mounted to a nacelle of a wind turbine.

The illustration in the drawings is in schematic form. It is noted that in different figures, similar or identical elements are provided with the same reference signs.

FIG. 1 shows a turning device 6 mounted to a nacelle 1 of a wind turbine.

FIG. 1 shows a nacelle 1 and a hub 2 of a wind turbine. A turning device 6 is attached to the nacelle 1 of the wind turbine.

The nacelle 1 comprises a housing 3. The housing 3 covers the interior of the nacelle 1 to protect it for negative influences coming from rain, humid air, dust and other influences of the environment.

The housing 3 comprises an opening 10. The turning device 6 is detachably attached to the wind turbine through the opening 10 of the housing 3 of the nacelle 1.

The turning device 6 is needed to turn the rotating part of the wind turbine, for example to install rotor blades to the hub 2. For the installation of rotor blades, the nacelle 1 with the hub 2 is normally installed on top of a tower. The turning device 6 can be lifted by a crane up to the nacelle 1 and can be mounted to the nacelle 1 of the wind turbine.

In this embodiment the hub 2 is prepared to receive three rotor blades.

The turning device 6 comprises a first lever 7, a second lever 8, and a drive 9. The drive 9 is prepared and arranged in a way that it can move the second lever 8 in respect to the first lever 7.

The levers 7, 8 reach through the opening 10, so that the drive 9 is arranged outside of the housing 3.

In at least one embodiment, the drive 9 comprises a linear actuator 14. In FIG. 1 two pairs of linear actuators 14 are shown.

The drive 9, in this embodiment the linear actuators 14, need to be powerful enough to rotate the hub 2 of the wind turbine, even when a load is present at the hub 2.

When rotor blades need to be installed, the drive needs to be powerful enough to rotate the hub 2, even if two of the three rotor blades are already installed.

In FIG. 1 the two pairs of linear actuators 14 are partially extended. In this position the second lever 8 is in a middle position between the two extreme positions in respect to the first lever 7.

The turning device 6 is only needed during installation or service. The turning device 6 is detached from the wind turbine, when the installation or the service is finished.

The turning device 6 comprises an adapter 18 to attach the turning device 6 to a crane, for example, or to a helicopter. So the turning device 6 can be hoisted to and from the nacelle 1 by the help of a crane or a helicopter.

After the turning device 6 is dismantled from the nacelle 1 of the wind turbine, the opening 10 can be closed by a cover.

Figure 2:
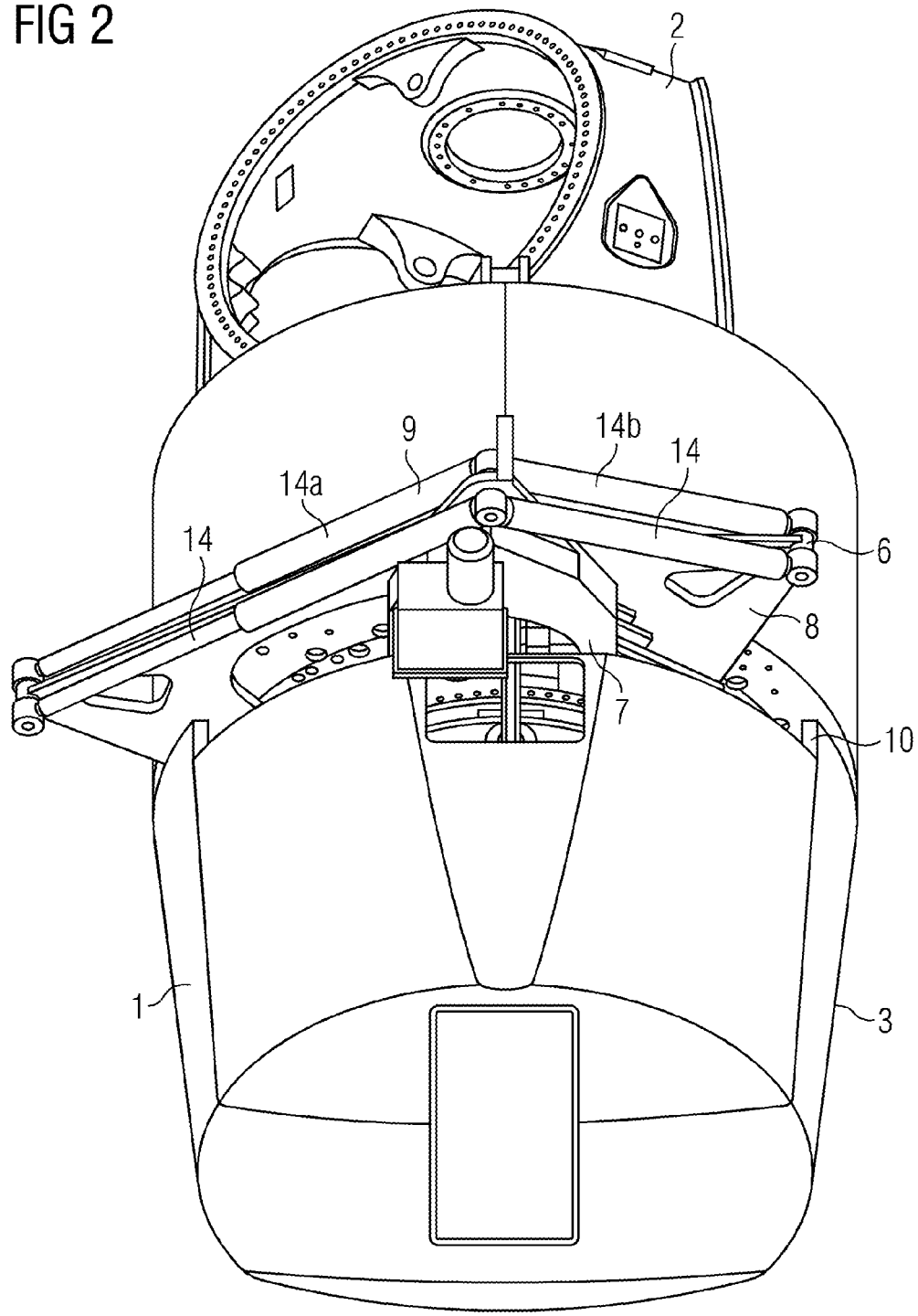
FIG. 2 shows another view of the turning device of a wind turbine.

FIG. 2 shows another view of the turning device 6 of a wind turbine.

FIG. 2 shows a nacelle 1 and a hub 2 attached to the nacelle 1. The nacelle 1 comprises a housing 3 that covers the interior of the nacelle 1. The housing 3 is thereby protecting the interior of the nacelle 1 from atmospheric influences, as weather, for example.

The housing 3 comprises an opening 10. The opening 10 is used to install and operate the turning device 6. The turning device 6 is used to rotate the rotatable part of the wind turbine in respect to the stationary part of the wind turbine.

The turning device comprises a first lever 7 that is attached to the stationary part of the wind turbine. The turning device 6 comprises in addition a second lever 8 that is connected to the rotatable part of the wind turbine.

The rotatable part of the wind turbine comprises the hub 2 and the rotor of the electrical generator. The hub and the rotor of the electrical generator can be rotated in respect to the stationary part of the wind turbine. This rotation can be performed by the turning device 6.

The turning device 6 comprises a drive 9 that is connected to the first lever 7 and the second lever 8. The drive 9 is prepared and arranged to move the second lever 8 in respect to the first lever 7.

In this embodiment the drive 9 is a linear actuator 14. A linear actuator is a hydraulic cylinder for example.

The rotation is a stepwise rotation. The rotatable part of the wind turbine is rotated a certain predetermined amount of degrees around the axis of rotation of the rotatable part with one stroke of the linear actuators.

The rotatable part is then locked by a rotor lock for example. The second lever 8 of the turning device 6 is detached from the rotatable part of the wind turbine and is reset to the start position. The second lever is then again attached to the rotatable part of the wind turbine again. The rotor-lock is detached so that the rotor can be rotated again, and the turning device can be used for a further stroke of the linear actuator to rotate the rotor.

The turning device 6 comprises a drive 9. The drive 9 is prepared and arranged between the first lever 7 and the second lever 8 in a way that it can move the second lever 8 in respect to the first lever 7. The second lever 8 is connected to the rotatable part of the wind turbine and the first lever 7 is connected to the stationary part of the wind turbine. Thus the rotatable part of the wind turbine is rotated in respect to the stationary part.

The drive 9 is arranged outside of the housing 3 of the nacelle 1.

In at least one embodiment, two linear actuators 14 are arranged in parallel to each other as a pair.

The drive 9 comprises a second pair of linear actuators. This second pair of linear actuators 14b is arranged in respect to the first pair of linear actuators 14a in a way that the second pair 14b expands while the first pair 14a retracts, and vice versa. To move the first lever 7 in respect to the second lever 8, one pair of linear actuators 14a expands and the other pair or linear actuators 14b retracts.

In FIG. 2 the linear actuators 14b are shown in a retracted state and the linear actuators 14a are shown in an expanded state. Thus the second lever 8 is in an extreme left position in respect to the first lever 7.

The first lever 7 and the second lever 8 are of a length that the drive 9 is arranged outside of the housing 3 of the nacelle 1. The longer the levers are the less force is needed to perform the rotation. Thus the force implied by the drive 9 is lower. In addition the space inside the nacelle 1 is limited, so it is difficult to place the linear actuators inside the nacelle 1.

After the rotation is performed and the turning device 6 is no longer needed, the turning device 6 is uninstalled. It is detached from the nacelle 1 and the opening 10 is closed by a cover.

Figure 3:
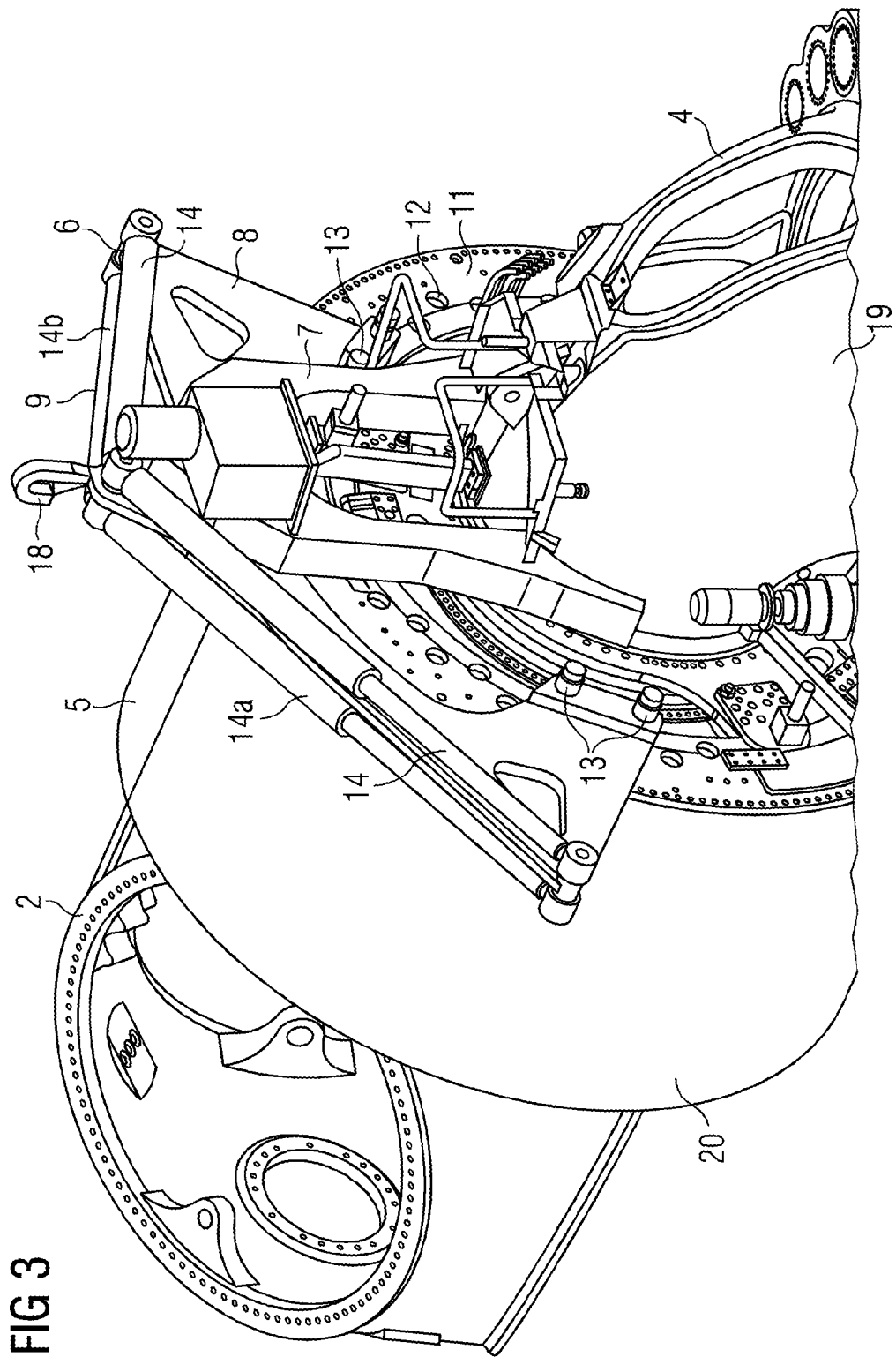
FIG. 3 shows a turning device mounted to the wind turbine.

FIG. 3 shows a turning device mounted to the wind turbine.

FIG. 3 shows a detail of the nacelle 1 of the wind turbine. A hub 2 is attached to the nacelle 1. The hub 2 and the rotor of the electrical generator 20 are part of the rotatable part 5 of the wind turbine.

The rotatable part 5 of the wind turbine is rotatable in respect to the stationary part 4 of the wind turbine. The stationary part 4 of the wind turbine comprises the stator of the electric generator 20 and a support structure 19 that supports the electrical generator 20 and the hub 2.

The turning device 6 comprises a first lever 7 that is attached to the stationary part 4 of the wind turbine. The second lever 8 of the turning device 6 connects with the rotatable part 5 of the wind turbine.

In this embodiment the second lever comprises pins 13 that connect to holes or cut-outs 12 of the brake disk 11. The pins 13 reach through the holes 12. When the second lever 8 is moved in respect to the first lever 7 the rotatable part 5 moves in respect to the stationary part 4.

A drive 9 is attached between the first lever 7 and the second lever 8 to perform the rotational movement. The drive 9 comprises 4 hydraulic cylinders as linear actuators 14. The linear actuators 14 are arranged in two pairs. Two of the linear actuators 14b are retracted and the other two linear actuators 14a are extended.

After the rotation is performed, the pins 13 retract from the holes 12, so that the second lever 8 is detached from the rotatable part 5 of the wind turbine. The second lever 8 can then be moved independent from the rotatable part 5 of the wind turbine.

Figure 4:
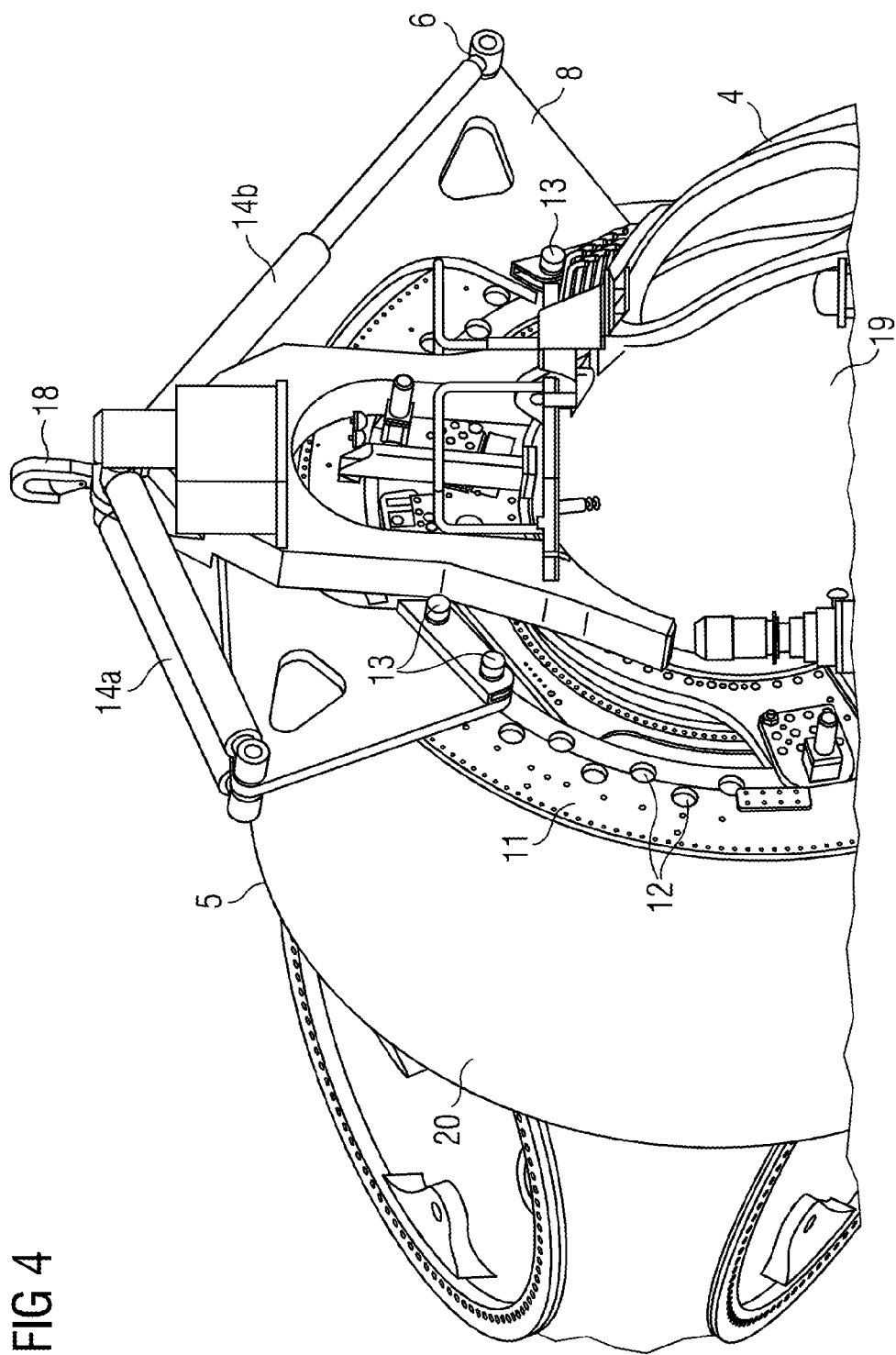
FIG. 4 shows another view of the turning device.

FIG. 4 shows another view of the turning device.

FIG. 4 shows another view of the turning device 6. The housing of the nacelle is not shown.

The first lever 7 of the turning device 6 is connected to the stationary part 4 of the wind turbine. In this embodiment the stationary part 4 of the wind turbine comprises a support structure 19 that supports the electrical generator 20. The first lever 7 is connected to the support structure 19.

A second lever 8 is connected to the rotatable part 5 of the wind turbine. The rotatable part of the wind turbine comprises the rotor of the electrical generator 20. In this embodiment the rotor of the electrical generator 20 comprises a brake disk 11. The brake disk 11 comprises holes 12.

The lever 8 comprises pins 13 that reach into the holes 12 to connect the second lever 8 with the brake disk 11 of the rotatable part 5 of the wind turbine.

The second lever 8 is movable in respect to the first lever 7. The rotatable part 5 of the wind turbine is connected to the second lever 8 and moves together with the second lever 8 in respect to the stationary part of the wind turbine 4.

In FIG. 4 the first pair of linear actuators 14a are retracted and the second pair of linear actuators 14b are extended. The second lever 8 is in FIG. 4 in an extreme right position in respect to the first lever 7.

The second lever 8 comprises pins 13 that interact with the holes 12 of the brake disk 11.

Figure 5:
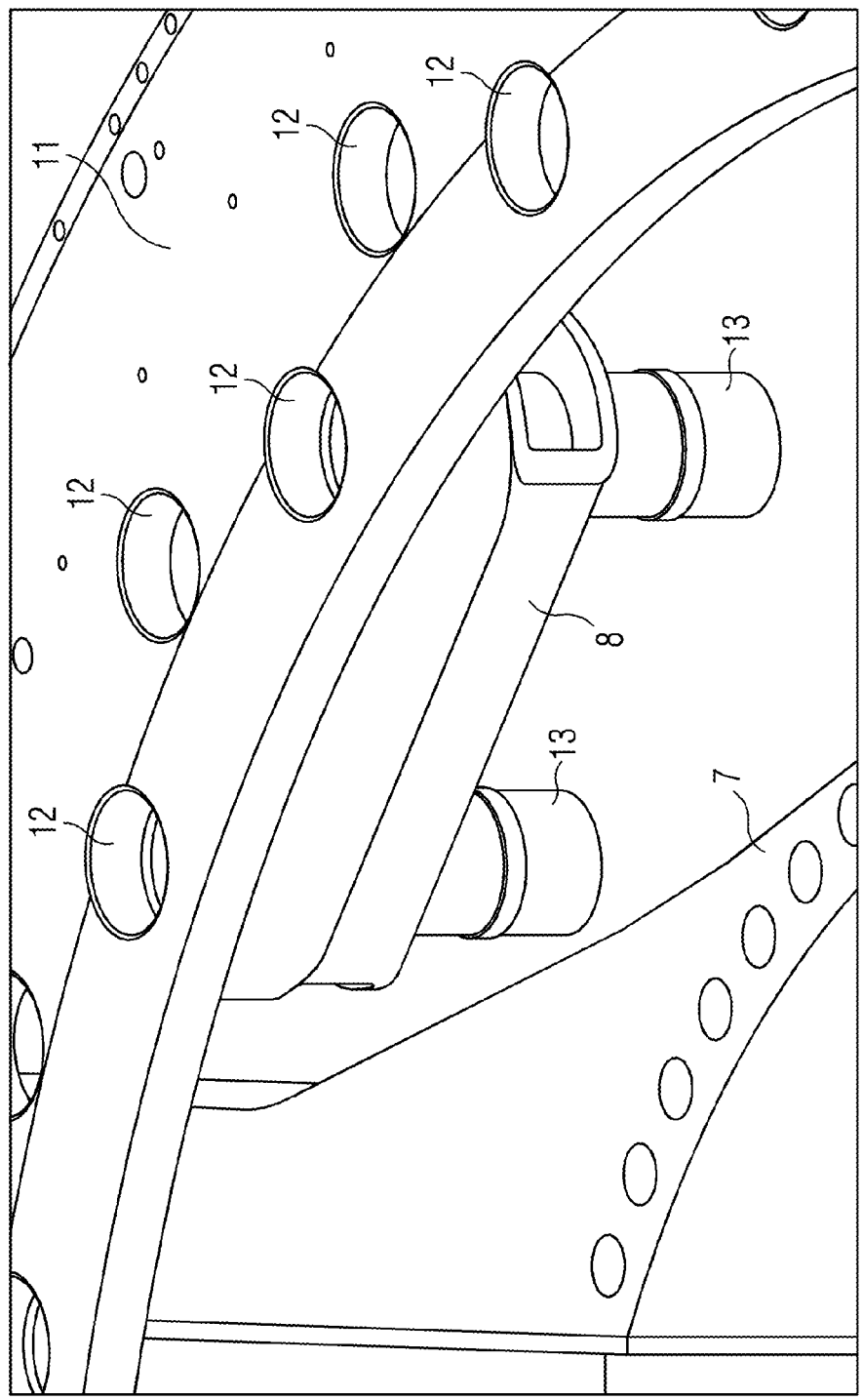
FIG. 5 shows a detail of the turning device.

FIG. 5 shows a detail of the turning device.

FIG. 5 shows a detail of the brake disk 11. The brake disk 11 comprises holes 12.

The second lever 8 comprises pins 13. The pins 13 can be moved into the holes 13, to connect the second lever 8 to the brake disk 11. When the pins 13 are connected to the brake disk 11 and the second lever 8 is moved, the brake disk 11 moves with the second lever 8.

The rotatable part 5 of the wind turbine comprises the brake disk 11, thus the rotatable part 5 of the wind turbine moves with the brake disk 11.

FIG. 5 shows the pins 13 in a refracted state. In this state the pins 13 are not connected to the brake disk 11.

Figure 6:
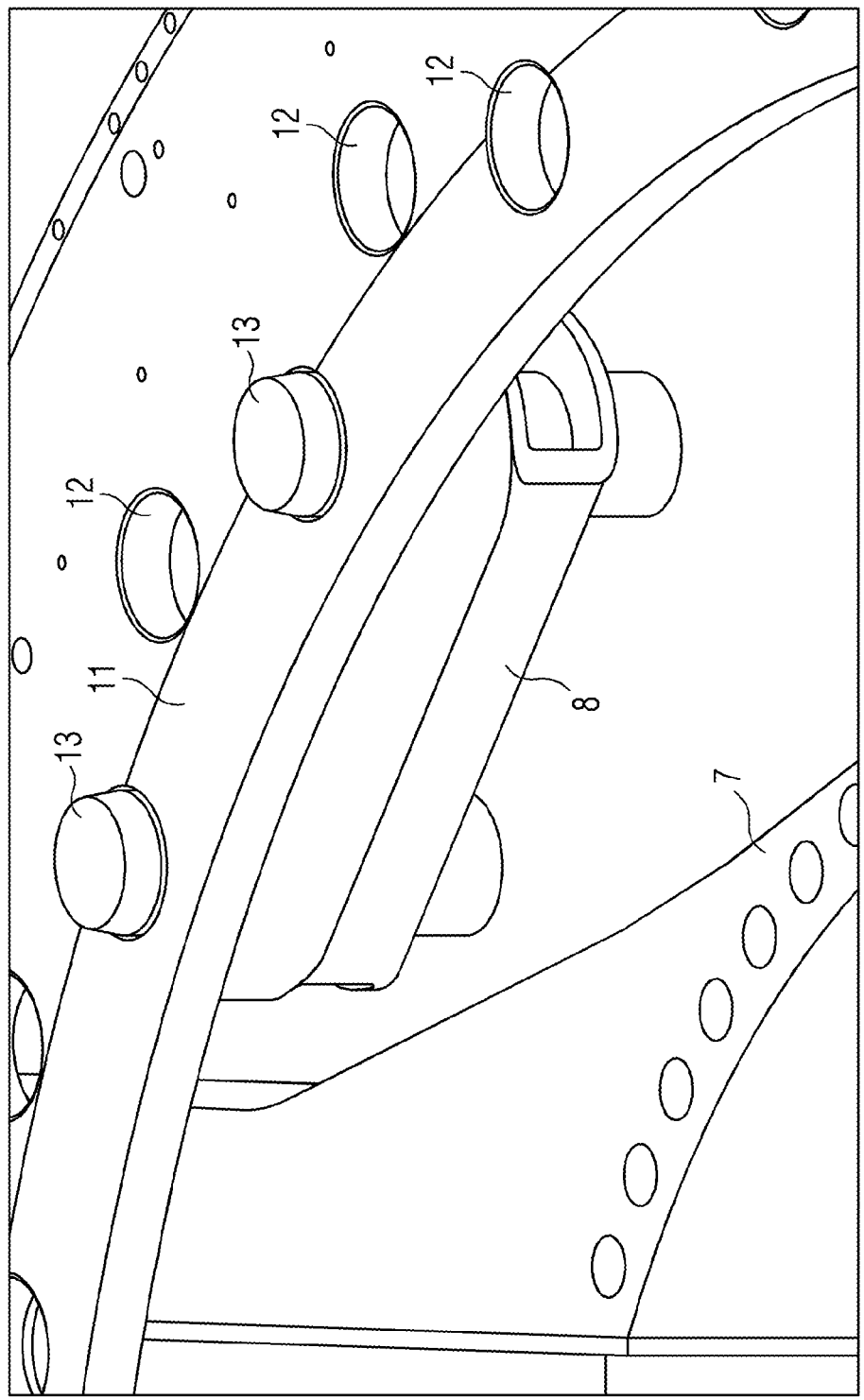
FIG. 6 shows a detail of the turning device engaged with the brake disk of the wind turbine.

FIG. 6 shows a detail of the turning device engaged with the brake disk of the wind turbine.

The second lever 8 of the turning device comprises pins 13. The pins 13 are prepared and arranged in a way to connect with the holes 12 of the brake disk 11.

In FIG. 6 the pins 13 are extended, thus they reach through the holes 12 of the brake disk 11. When the second lever 8 is moved in respect to the first lever 7, the brake disk 11 is moving together with the second lever 8.

Figure 7:
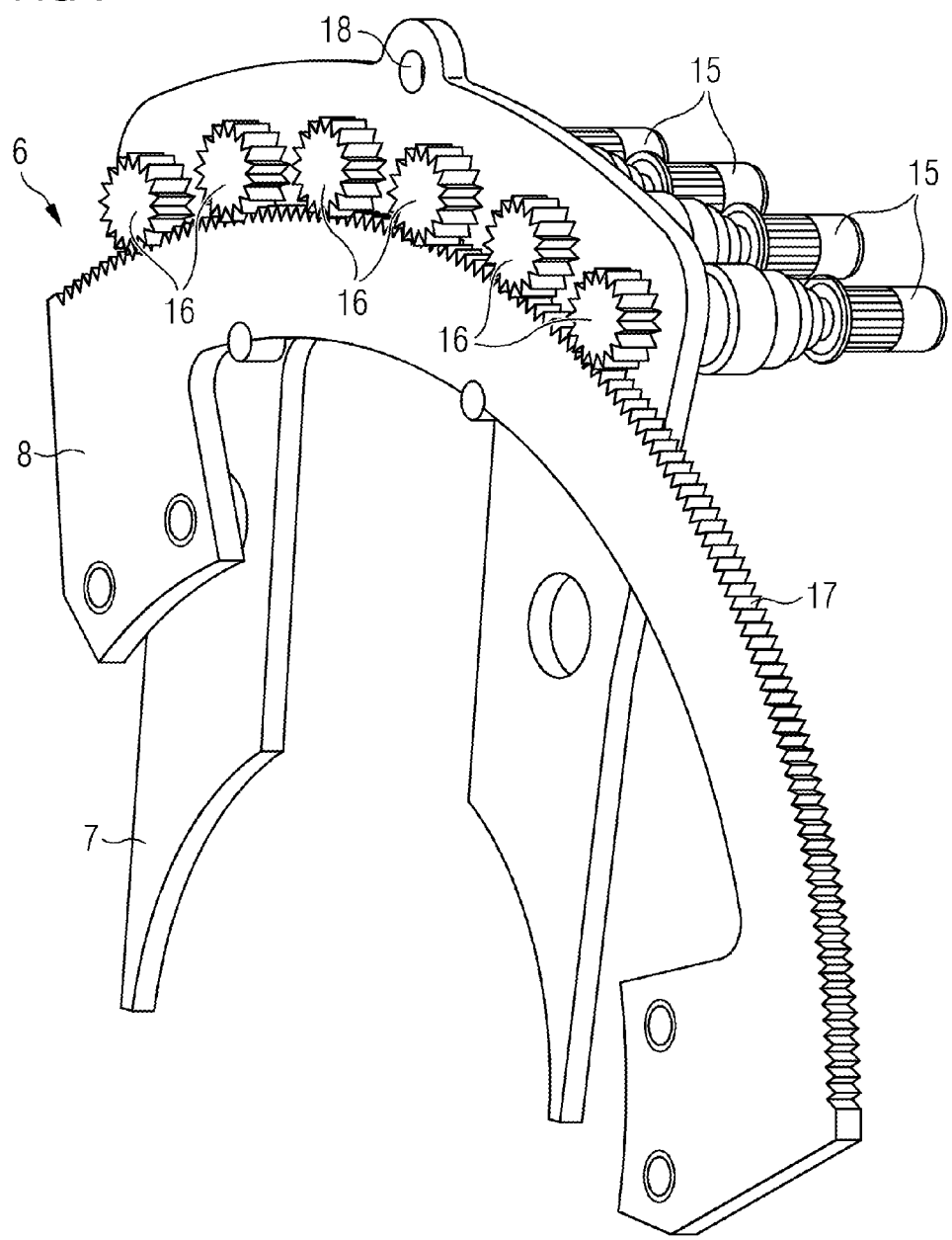
FIG. 7 shows a turning device with another embodiment of a drive.

FIG. 7 shows a turning device with another embodiment of a drive.

The turning device 6 comprises a first lever 7 and a second lever 8. The turning device comprises a drive. The drive is capable of moving the second lever 8 in respect to the first lever 7.

The drive comprises motors 15 that are equipped with a toothed wheel 16. The motors 15 with the toothed wheels 16 are connected to the first lever 7. The second lever 8 comprises a toothed rim 17. The toothed wheels 16 interact with the toothed rim 17.

When the motors 15 rotate the toothed wheels 16 the second lever 8 is moved in respect to the first lever 7.

Although the present invention has been described in detail with reference to the at least one embodiment, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The invention claimed is:

1. A turning device to rotate a rotatable part of a wind turbine, comprising:
   the wind turbine including a stationary part and the rotatable part;
   whereby the rotatable part is rotatable with respect to the stationary part of the wind turbine;
   whereby the stationary part is located within a nacelle;
   whereby the nacelle is at least partially enclosed by a housing;
   whereby the rotatable part comprises a hub of a rotor of the wind turbine;
   whereby the turning device is detachably attached to the wind turbine to rotate the rotatable part with respect to the stationary part;
   whereby the turning device comprises a first lever that is detachably attached to the stationary part of the wind turbine;
   whereby the turning device comprises a second lever that is detachably attached to the rotatable part of the wind turbine; and
   whereby the turning device comprises a drive that is prepared and arranged in a way to move the first lever with respect to the second lever to rotate the rotatable part of the wind turbine with respect to the stationary part;
   wherein the first lever and the second lever are arranged in a way that they reach from an inside of the housing of the nacelle through an opening to an outside of the nacelle so that the drive is located outside of the housing of the nacelle when the turning device is attached to the wind turbine.

2. The turning device according to claim 1, whereby the rotatable part of the wind turbine comprises a brake disk and the second lever is attached to the brake disk.

3. The turning device according to claim 2, whereby the brake disk comprises a plurality of holes or cut-outs and the second lever comprises at least one pin, whereby the at least one pin is prepared and arranged in a way that it reaches through one of the plurality of holes or cut-outs of the brake disk to connect the second lever to the brake disk.

4. The turning device according to claim 3, whereby at least two pins are prepared and arranged in a way that they reach through two adjacent holes or cut-outs of the plurality of holes or cut-outs.

5. The turning device according to claim 3,
   whereby the second lever comprises at least two pins that are arranged in a way to connect to the brake disk;
   whereby the at least two pins are arranged with a certain predetermined distance, and
   whereby the certain predetermined distance corresponds to an angle of at least 60° seen from a rotational axis of the brake disk.

6. The turning device according to claim 1, whereby the stationary part of the wind turbine comprises a machine frame and the first lever is attached to the machine frame.

7. The turning device according to claim 1, whereby the stationary part of the wind turbine comprises a support structure that supports an electrical generator of the wind turbine, and the first lever is attached to the support structure.

8. The turning device according to claim 1, whereby the stationary part of the wind turbine comprises a stator of the electric generator, and the first lever is attached to the stator of the electric generator.

9. The turning device according to claim 1, whereby the drive comprises at least one linear actuator.

10. The turning device according to claim 9, whereby the at least one linear actuator comprises a first linear actuator and a second linear actuator which are prepared and arranged in a way that the first linear actuator extends while the second linear actuator retracts when the turning device rotates the rotatable part of the wind turbine.

11. The turning device according to claim 9, whereby the at least one linear actuator comprises a hydraulic cylinder.

12. The turning device according to claim 1, whereby the drive comprises at least one rotatable drive.

13. The turning device according to claim 12,
   whereby the at least one rotatable drive comprises at least one toothed wheel and the second lever comprises a toothed rim; and
   whereby the at least one toothed wheel is prepared and arranged in a way to interact with the toothed rim of the second lever.

14. The turning device according to claim 1, whereby the turning device comprises an adapter for a hook of a crane to hoist the turning device to the nacelle.

\* \* \* \* \*